(12) United States Patent
Wang et al.

(10) Patent No.: US 12,483,460 B2
(45) Date of Patent: Nov. 25, 2025

(54) NETWORK SWITCH AND ABNORMITY DETECTING METHOD

(71) Applicant: Realtek Semiconductor Corporation, Hsinchu (TW)

(72) Inventors: Sz-Han Wang, Hsinchu (TW); Kai-Wen Cheng, Hsinchu (TW); Ming-Dao Chen, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 537 days.

(21) Appl. No.: 17/658,445

(22) Filed: Apr. 8, 2022

(65) Prior Publication Data

US 2022/0360488 A1 Nov. 10, 2022

(30) Foreign Application Priority Data

May 5, 2021 (TW) .................................. 110116270

(51) Int. Cl.
*H04L 41/0604* (2022.01)
*H04L 41/0663* (2022.01)
(Continued)

(52) U.S. Cl.
CPC ...... *H04L 41/0622* (2013.01); *H04L 41/0663* (2013.01); *H04L 41/0681* (2013.01); *H04L 49/555* (2013.01)

(58) Field of Classification Search
CPC ............. H04L 41/0622; H04L 41/0663; H04L 41/0681; H04L 49/555
See application file for complete search history.

(56) References Cited

U.S. PATENT DOCUMENTS 6,233,242 B1 * 5/2001 Mayer .................. H04L 49/103
370/392
8,509,106 B2 8/2013 Wang et al.
(Continued)

FOREIGN PATENT DOCUMENTS

CN 104518989 A * 4/2015 ......... H04L 43/0888
CN 111064714 A * 4/2020
(Continued)

OTHER PUBLICATIONS

IP.com IPCOM000213916D "Simplified Threshold Adjuster for Systems Generating Notifications," Jan. 5, 2012, https://ip.com/IPCOM/000213916 (Year: 2012).*
(Continued)

*Primary Examiner* — Kathy W Wang-Hurst
*Assistant Examiner* — Garth D Richmond
(74) *Attorney, Agent, or Firm* — CKC & Partners Co., LLC (57) ABSTRACT

A network switch is configured to receive packet data. The network switch includes a memory and a processor. The memory is configured to store an access control list and an abnormity detecting program, filter the packet data according to the access control list, and perform an abnormity detecting procedure on the packet data according to the abnormity detecting program. When at least one abnormity event occurs in one of a plurality of time intervals, a counting value increases. When the counting value reaches a counting threshold value, the memory sends an abnormity notification to the processor and the processor performs an abnormity processing procedure on the packet data.

11 Claims, 4 Drawing Sheets

(51) Int. Cl.
    *H04L 41/0681*    (2022.01)
    *H04L 49/55*    (2022.01)

(56) References Cited

U.S. PATENT DOCUMENTS

| | | | | |
|---|---|---|---|---|
| 9,629,004 | B2* | 4/2017 | Hassan | H04L 41/22 |
| 2007/0130619 | A1* | 6/2007 | Reams | H04L 63/1425 |
| | | | | 726/13 |
| 2012/0159265 | A1* | 6/2012 | Nishita | G06F 11/1443 |
| | | | | 714/49 |
| 2012/0209411 | A1* | 8/2012 | Ohkado | G05B 19/048 |
| | | | | 700/80 |
| 2015/0098337 | A1* | 4/2015 | Enkovaara | H04L 47/2441 |
| | | | | 370/236 |
| 2018/0139086 | A1* | 5/2018 | Chakraborty | H04L 43/0823 |
| 2018/0288145 | A1* | 10/2018 | Levy | G06F 11/1451 |
| 2019/0372874 | A1* | 12/2019 | Sanders | H04L 1/203 |

FOREIGN PATENT DOCUMENTS

| | | | | |
|---|---|---|---|---|
| JP | 2006135949 A | | 5/2006 | |
| WO | WO-2006069041 A2 | * | 6/2006 | G06F 16/90344 |

OTHER PUBLICATIONS

Li-Chyun Cheng et al., "A Novel Intrusion Detection Architecture Based on the Co-Stimulation Mechanism", retrieved from http://hdl.handle.net/11536/77177, Master's Thesis, Institute of Information Management College of Management, National Chiao Tung University, 2004.

* cited by examiner

| | |
|---|---|
| time interval length TS | a length of one time interval for detecting whether an abnormity event occurs |
| counting threshold value MT | when the counting value reaches this value, the abnormity notification is triggered |
| abnormity processing procedure RD | dropping the packet data PK or redirecting the packet data PK |

NETWORK SWITCH AND ABNORMITY DETECTING METHOD

RELATED APPLICATIONS

This application claims priority to Taiwanese Application Serial Number 110116270, filed May 5, 2021, which is herein incorporated by reference.

BACKGROUND

Technical Field

The present disclosure relates to network technology. More particularly, the present disclosure relates to a network switch and an abnormity detecting method.

Description of Related Art

With development of technology, network systems are widely applied in business or our daily life. In general, each of the network systems include one or more network switches. The network switches can exchange date from different network apparatuses. In some related approaches, once an abnormity event occurs, the network switch immediately performs the abnormity processing procedure. However, this causes the processor of the network switch to perform the abnormity processing procedure too frequently, thereby reducing its utilization.

SUMMARY

Some aspects of the present disclosure are to provide a network switch. The network switch is configured to receive packet data. The network switch includes a memory and a processor. The memory is configured to store an access control list and an abnormity detecting program, filter the packet data according to the access control list, and perform an abnormity detecting procedure on the packet data according to the abnormity detecting program. When at least one abnormity event occurs in one of a plurality of time intervals, a counting value increases. When the counting value reaches a counting threshold value, the memory sends an abnormity notification to the processor and the processor performs an abnormity processing procedure on the packet data.

Some aspects of the present disclosure are to provide an abnormity detecting method. The abnormity detecting method includes following operations: receiving, by a network switch, packet data; filtering, by a memory of the network switch, the packet data according to an access control list, and performing, by the memory, an abnormity detecting procedure on the packet data according to an abnormity detecting program; increasing a counting value when at least one abnormity event occurs in one of a plurality of time intervals; and sending, by the memory, an abnormity notification to a processor of the network switch when the counting value reaches a counting threshold value, in which the processor performs an abnormity processing procedure on the packet data.

BRIEF DESCRIPTION OF THE DRAWINGS

The disclosure can be more fully understood by reading the following detailed description of the embodiment, with reference made to the accompanying drawings as follows.

DETAILED DESCRIPTION

In the present disclosure, "connected" or "coupled" may refer to "electrically connected" or "electrically coupled." "Connected" or "coupled" may also refer to operations or actions between two or more elements.

Figure 1:
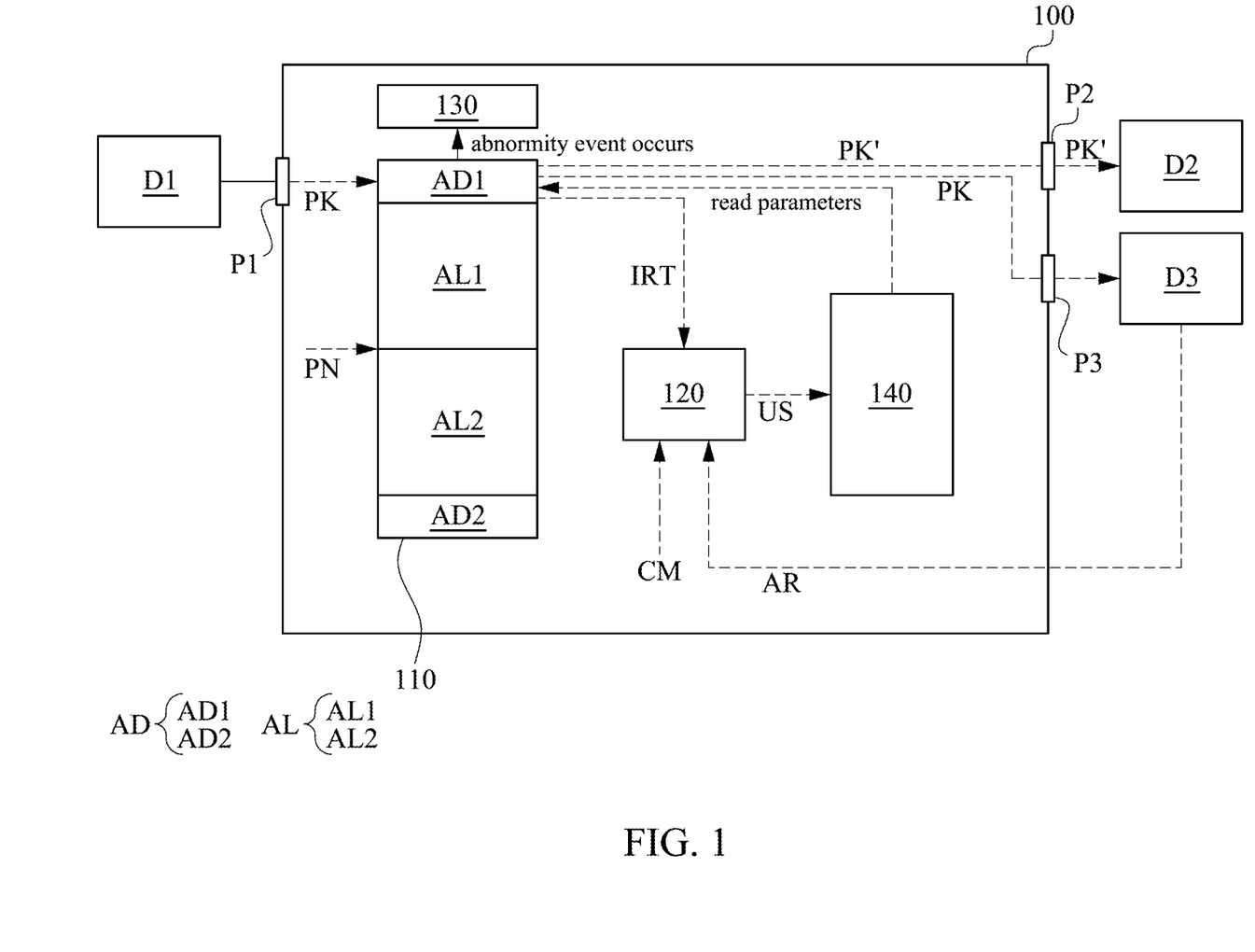
FIG. 1 is a schematic diagram of a network switch according to some embodiments of the present disclosure.

Reference is made to FIG. 1. FIG. 1 is a schematic diagram of a network switch 100 according to some embodiments of the present disclosure. In some embodiments, the network switch 100 is an Ethernet switch.

As illustrated in FIG. 1, the network switch 100 includes a connecting port P1, a connecting port P2, and a connecting port P3. The network switch 100 is coupled to a network connection device D1 through the connecting port P1, coupled to a network connection device D2 through the connecting port P2, and coupled to an external analyzing device D3 through the connecting port P3. The network switch 100 can receive packet data PK from the network connection device D1 through the connecting port P1, and output packet data PK' to the network connection device D2 through the connecting port P2 according to a destination address. The external analyzing device D3 can analyze the packet data PK.

As illustrated in FIG. 1, the network switch 100 includes a memory 110, a processor 120, a counter 130, and a register 140. In addition to the connecting ports P1-P3, the memory 110 is further coupled to the processor 120, the counter 130, and the register 140. The register 140 is coupled to the processor 120.

The memory 110 is configured to store an access control list AL and an abnormity detecting program AD. The memory 110 can filter the packet data PK according to the access control list AL. For example, the access control list AL can include a plurality of entries. Each of the entries can correspond to a rule and an action. The memory 110 can compare the packet data PK with these rules and perform a corresponding action on the packet data PK according to the comparison result to implement the filtering procedure and generate the packet data PK'. The aforementioned "action" can be, for example, to send a notification, to limiting speed/flow, to drop (discard) packet data, or to redirect packet data, but the present disclosure is not limited thereto.

In some embodiments, the memory 110 is a Ternary Content Addressable Memory (TCAM). In these embodiments, the packet data PK are compared with these rules in a "parallel" method. In other words, the packet data PK can be compared with these rules simultaneously.

As illustrated in FIG. 1, the access control list AL includes a control block AL1 and a control block AL2. Each of the control block AL1 and the control block AL2 includes the aforementioned entries. In some embodiments, the control block AL1 is an ingress control block, and the control block AL2 is an egress control block. In other words, the control block AU (ingress control block) is used to filter the packet data PK which is inputted into the network switch 100 and is not processed by the network switch 100 yet. The control block AL2 (egress control block) is used to filter the packet data PK which has been processed by the network switch 100.

Taking the control block AL1 as an example, headers of the packet data PK which is just inputted into the network switch 100 and is not processed by the network switch 100 yet can be extracted. Then, the extracted headers are compared with the rules of the entries in the control block AL1, and corresponding actions are performed on the packet data PK according to the comparison results to implement the ingress filtering procedure. The control block AL2 has similar operations to implement the egress filtering process, and they are not described herein again.

Since the control block AL1 and the control block AL2 share the storage capacity of the memory 110, the structure in FIG. 1 can be called as a "shared TCAM structure." In some embodiments, a ratio of the control block AL1 and the control block AL2 in the memory 110 can be adjusted by a user according to practical requirements. For example, when the user inputs (sets) a ratio of the control block AL1 and the control block AL2 through an input device, a partition number command PN is generated in the network switch 100. Then, the ratio of the control block AU and the control block AL2 in the memory 110 can be determined according to the partition number command PN.

In addition, the memory 110 can perform an abnormity detecting procedure on the packet data PK according to the abnormity detecting program AD. The abnormity detecting program AD includes a detecting block AD1 and a detecting block AD2.

As illustrated in FIG. 1, the detecting block AD1, the control block AL1, the control block AL2, and the detecting block AD2 are disposed sequentially in the memory 110. Explained in another way, the detecting block AD1 is adjacent to the control block AL1, and the detecting block AD2 is adjacent to the control block AL2. With this configuration, the detecting block AD1 can be used to control the control block AL1 to support the abnormity detecting procedure, and the detecting block AD2 can be used to control the control block AL2 to support the abnormity detecting procedure. Accordingly, both of the detecting block AD1 and the detecting block AD2 can support to support the abnormity detecting procedure.

In some related approaches, only one abnormity detecting program is in the memory and only one control block (e.g., the control block AL1 or the control block AL2) is adjacent to this abnormity detecting program. Accordingly, only one control block (e.g., the control block AL1 or the control block AL2) can support the abnormity detecting procedure.

Compared to the aforementioned related approaches, both of the detecting block AD1 and the detecting block AD2 are in the memory 110 the present disclosure. Accordingly, the detecting block AD1 and the detecting block AD2 can be used to respectively control the control block AL1 and the control block AL2 to support the abnormity detecting procedure.

Figure 2:
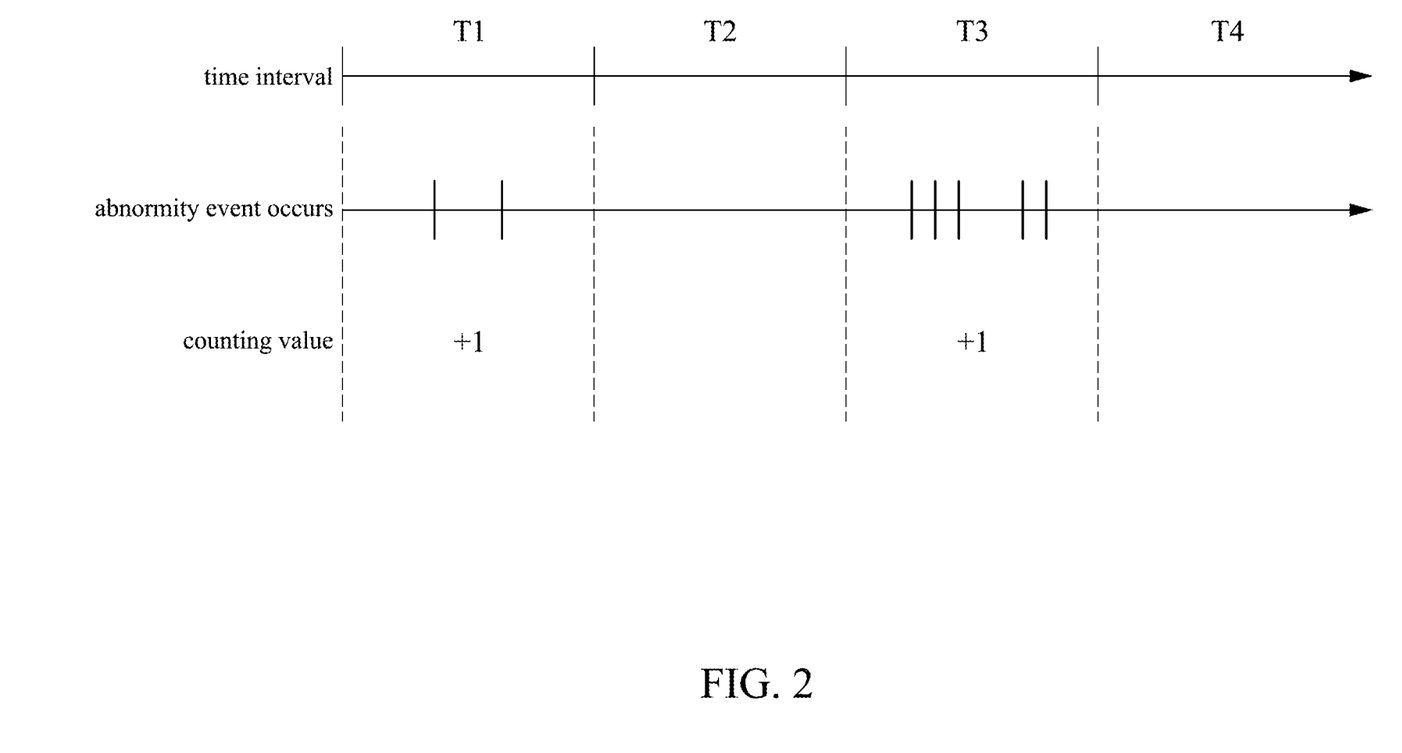
FIG. 2 is a time sequence diagram of an abnormity detecting procedure according to some embodiments of the present disclosure.

Then, references are made to FIG. 1 and FIG. 2. FIG. 2 is a time sequence diagram of an abnormity detecting procedure according to some embodiments of the present disclosure.

The following paragraphs take the detecting block AD1 used to control the control block AL1 to support the abnormity detecting procedure as an example. Since operations of the detecting block AD2 and the control block AL2 are similar to those of the detecting block AD1 and the control block AL1, they are not described herein again.

When the network switch 100 receives the packet data PK, the control block AU can filter the packet data PK and the detecting block AD1 can control the control block AL1 to support the abnormity detecting procedure.

At first, a plurality of time intervals T1-T4 (e.g., 1 millisecond) can be set for a specific type of packet data PK. In practical applications, different types of packet data PK can correspond to time intervals with different lengths. In addition, an upper limit value (e.g., 10M bits per second) can be set for this specific type of packet data PK. In practical applications, different types of packet data PK can correspond to different upper limit values.

In some embodiments, when a flow value of this specific type of packet data PK reaches the upper limit value, it indicates that an abnormity event occurs. As illustrated in FIG. 2, there are two abnormity events in the time interval T1, and there are five abnormity events in the time interval T3. In some embodiments, a counting value of the counter 130 increases by 1 no matter how many abnormity events occur in one time interval. Accordingly, in the example in FIG. 2, an initial counting value of the counter 130 is 0, and the counting value of the counter 130 increases by 1 (the counting value is equal to 1) after the time interval T1. Then, the counting value of the counter 130 increases by 1 again (the counting value is equal to 2) after the time interval T3.

In addition, a counting threshold value can be set for this specific type of packet data PK. In practical applications, different types of packet data PK can correspond to different counting threshold values. The counting value of the counter 130 can be compared with the counting threshold value. When the counting value of the counter 130 reaches the counting threshold value, the memory 110 sends an abnormity notification IRT to the processor 120 to notice the processor 120 to perform the abnormity processing procedure on the packet data PK.

In some embodiments, the length of each of the aforementioned time intervals T1-T4, the aforementioned upper limit value, or the aforementioned counting threshold value can be temporarily stored in the register 140. In some embodiments, the length of each of the time intervals T1-T4, the upper limit value, or the counting threshold value stored in the register 140 can be adjusted according to user's practical requirements (e.g., importance or impact of the specific of the packet data PK). For example, when a user inputs (sets) the length of each of the time intervals T1-T4, the upper limit value, or the counting threshold value through an input device, a setting command CM is generated in the network switch 100. Then, the processor 120 can send an updating signal US according to the setting command CM to update the length of each of the time intervals T1-T4, the upper limit value, or the counting threshold value temporarily stored in the register 140. Accordingly, the application flexibility of the network switch 100 can be improved.

In some other embodiments, the register 140 can be implemented by a plurality of registers.

In some embodiments, the abnormity processing procedure may be a packet drop procedure or a packet redirection procedure. In other words, when the counting value of the counter 130 reaches the counting threshold value, the packet data PK can be drop or can be redirected to the connecting port P3.

Regarding the packet drop procedure, in some embodiments, when the counting value of the counter 130 reaches the counting threshold value, it indicates that the network switch 100 often receives a large amount of this specific type of packet data PK. The packet data PK occupies the inner bandwidth of the network switch 100. However, by dropping the packet data PK when the counting value of the counter 130 reaches the counting threshold value, the inner bandwidth of the network switch 100 cab be saved. In addition, it can prevent the back-end server from crashing due to a large number of packet data.

Regarding the packet redirection procedure, in some embodiments, the packet data PK can be redirected to the external analyzing device D3 when the counting value of the counter 130 reaches the counting threshold value. The external analyzing device D3 can analyze the redirected packet data PK to generate an analyzing result AR (e.g., analyze a current network state). Then, the network switch 100 can automatically adjust the parameters (e.g., the upper limit value or the counting threshold value) which is temporarily stored in the register 140 according to the analyzing result AR. For example, when the analyzing result AR indicates that this specific type of packet data PK needs a larger bandwidth in this network state, the processor 120 can send the updating signal US according to the analyzing result AR to increase the upper limit value which is temporarily stored in the register 140. Accordingly, the network switch 100 can achieve the effects of self-learning and dynamic adjustment.

In some other embodiments, the processor 120 can adjust the counting threshold value which is temporarily stored in the register 140 according to a frequency of how often the abnormity notification IRT is received. For example, when the frequency of receiving the abnormity notification IRT is too high, the processor 120 can send the updating signal US to increase the counting threshold value which is temporarily stored in the register 140. When the frequency of receiving the abnormity notification IRT is too low, the processor 120 can send the updating signal US to decrease the counting threshold value which is temporarily stored in the register 140. Accordingly, utilization of the processor 120 can be improved.

In some related approaches, once an abnormity event occurs, the network switch immediately performs the abnormity processing procedure. However, this causes the processor of the network switch to perform the abnormity processing procedure too frequently, thereby reducing its utilization.

Compared to the aforementioned related approaches, in the present disclosure, when at least one abnormity events occurs in one of the time intervals, the counting value increases. In addition, when the counting value reaches the counting threshold value, the abnormity notification IRT is sent to the processor 120 to perform the abnormity processing procedure on the packet data PK. Accordingly, this can prevent the processor 120 from performing the abnormity processing procedure too frequently to improve the utilization of the processor 120. In addition, in some embodiments of the present disclosure, the counting value just increases by 1 no matter how many abnormity events occur in one of the time intervals. Accordingly, the counter 130 can be designed with less bits to reduce hardware cost.

Figure 3:
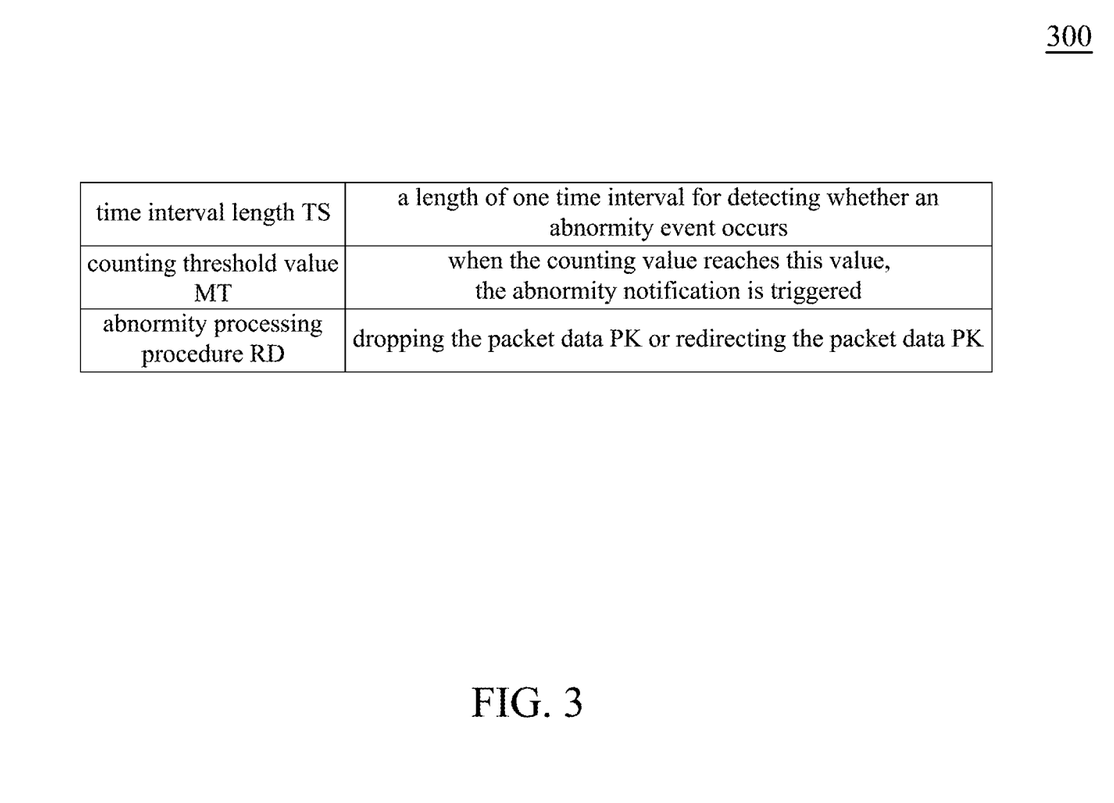
FIG. 3 is a schematic diagram of a configuration of parameters according to some embodiments of the present disclosure.

References are made to FIG. 1, FIG. 2, and FIG. 3. FIG. 3 is a schematic diagram of a configuration 300 according to some embodiments of the present disclosure.

As illustrated in FIG. 3, the configuration 300 can be stored in the register 140 and a user can set a length TS of one time interval, a counting threshold value MT, and an abnormity processing procedure RD in the configuration 300. The length TS indicates that a length of one of the time intervals T1-T4 for detecting whether an abnormity event occurs. The counting threshold value MT indicates the abnormity notification IRT is sent to the processor 120 when the counting value of the counter 130 reaches this value. The abnormity processing procedure RD indicates to drop the packet data PK or to redirect the packet data PK. For example, when the abnormity processing procedure RD is 0, the current abnormity processing procedure RD is to drop the packet data PK. When the abnormity processing procedure RD is 0x000A, the current abnormity processing procedure RD is to redirect the packet data PK to the connecting port P3. In some embodiments, the configuration 300 further include the aforementioned upper limit value and a user can set this upper limit value in the configuration 300. The upper limit value is a criterion of determining whether an abnormity even occurs.

Figure 4:
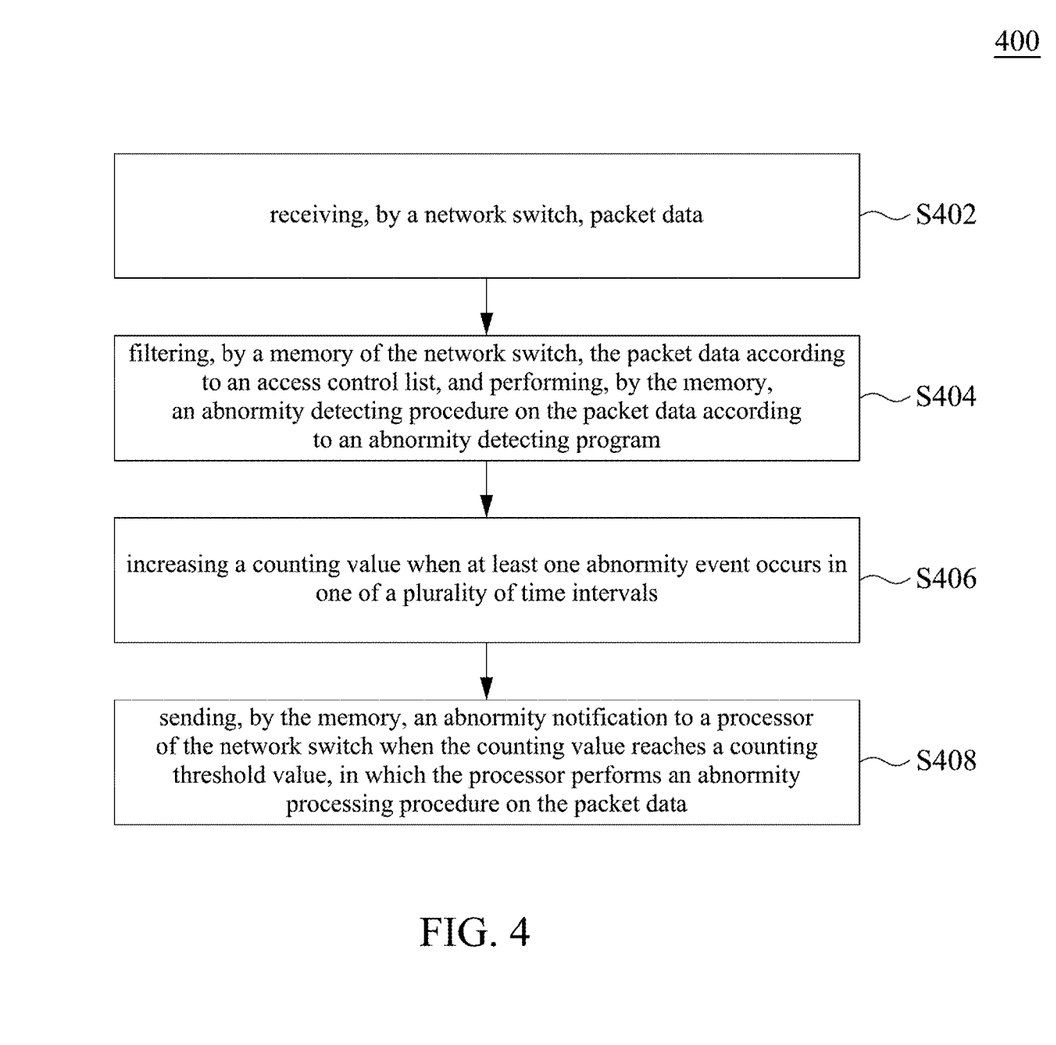
FIG. 4 is a flow diagram of an abnormity detecting method according to some embodiments of the present disclosure.

Reference is made to FIG. 4. FIG. 4 is a flow diagram of an abnormity detecting method 400 according to some embodiments of the present disclosure. In some embodiments, the abnormity detecting method 400 is applied to the network switch 100 in FIG. 1, but the present disclosure is not limited thereto. As illustrated in FIG. 4, the abnormity detecting method 400 includes operations S402, S404, S406, and S408.

In operation S402, the network switch 100 receives the packet data PK. In some embodiments, the network switch 100 is the Ethernet switch.

In operation S404, the memory 110 filters the packet data PK according to the access control list AL, and performs the abnormity detecting procedure on the packet data PK according to the abnormity detecting program AD. In some embodiments, the memory 110 is the TCAM.

In operation S406, when at least one abnormity event occurs in one of the time intervals T1-T4, the counting value increases. In some embodiments, the counting value of the counter 130 increases by 1 no matter how many abnormity events occur in one time interval.

In operation S408, when the counting value of the counter 130 reaches the counting threshold value, the memory 110 sends the abnormity notification IRT to the processor 120 to notice the processor 120 to perform the abnormity processing procedure on the packet data PK. In some embodiments, the abnormity processing procedure may be a packet drop procedure or a packet redirection procedure.

As described above, in the network switch and the abnormity detecting method of the present disclosure, when at least one abnormity events occurs in one of the time intervals, the counting value increases. In addition, when the counting value reaches the counting threshold value, the abnormity notification IRT is sent to the processor and the processor performs the abnormity processing procedure on the packet data. Accordingly, this can prevent the processor from performing the abnormity processing procedure too frequently to improve the utilization of the processor.

Various functional components or blocks have been described herein. As will be appreciated by persons skilled in the art, in some embodiments, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuity in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A network switch configured to receive packet data, wherein the network switch comprises:
   a memory configured to store an access control list and an abnormity detecting program, filter the packet data according to the access control list, and perform an abnormity detecting procedure on the packet data according to the abnormity detecting program, wherein the access control list comprises a plurality of entries, and each of the plurality of entries corresponds to a rule and an action;
   a processor, wherein when at least one abnormity event occurs in one of a plurality of time intervals, a counting value increases by 1, comprising:
      when a quantity of the at least one abnormity event is two or more than two in the one of the plurality of time intervals, the counting value increases by 1,
   wherein when the counting value reaches a counting threshold value, the memory sends an abnormity notification to the processor and the processor performs an abnormity processing procedure on the packet data,
   wherein the processor is configured to increase the counting threshold value according to a first frequency, greater than an upper limit frequency, of how often the abnormity notification is received and to decrease the counting threshold value according to a second frequency, smaller than a lower limit frequency, of how often the abnormity notification is received, wherein the first frequency is higher than the second frequency,
   wherein the access control list comprises a first control block and a second control block, and the abnormity detecting program comprises a first detecting block and a second detecting block,
   wherein the first detecting block, the first control block, the second control block, and the second detecting block are disposed sequentially in the memory, and the first detecting block and the second detecting block are configured to respectively control the first control block and the second control block to support the abnormity detecting procedure; and
   at least one register configured to store a length of each of the plurality of time intervals, the counting threshold value, and an upper limit value, wherein the abnormity event is that a flow value of the packet data reaches the upper limit value.

2. The network switch of claim 1, wherein the length of each of the plurality of time intervals, the counting threshold value, or the upper limit value is updated according to a setting command corresponding to an input of a user.

3. The network switch of claim 1, wherein the abnormity processing procedure comprises a packet drop procedure or a packet redirection procedure.

4. The network switch of claim 3, wherein the packet redirection procedure is that the packet data is redirected to a connecting port which is in the network switch and is coupled to an external analyzing device.

5. The network switch of claim 4, wherein the processor is further configured to adjust the upper limit value according to an analyzing result of the external analyzing device.

6. The network switch of claim 1, wherein the memory is a ternary content addressable memory.

7. An abnormity detecting method, comprising:
   receiving, by a network switch, packet data;
   filtering, by a memory of the network switch, the packet data according to an access control list, and performing, by the memory, an abnormity detecting procedure on the packet data according to an abnormity detecting program, wherein the access control list comprises a plurality of entries, and each of the plurality of entries corresponds to a rule and an action;
   increasing a counting value by 1 when at least one abnormity event occurs in one of a plurality of time intervals, comprising:
      increasing the counting value by 1 when a quantity of the at least one abnormity event is two or more than two in the one of the plurality of time intervals;
   sending, by the memory, an abnormity notification to a processor of the network switch when the counting value reaches a counting threshold value, wherein the processor performs an abnormity processing procedure on the packet data, comprising:
      increasing the counting threshold value according to a first frequency, greater than an upper limit frequency, of how often the abnormity notification is received; and
      decreasing the counting threshold value according to a second frequency, smaller than a lower limit frequency, of how often the abnormity notification is received, wherein the first frequency is higher than the second frequency,
   wherein the access control list comprises a first control block and a second control block, and the abnormity detecting program comprises a first detecting block and a second detecting block,
   wherein the first detecting block, the first control block, the second control block, and the second detecting block are disposed sequentially in the memory, and the first detecting block and the second detecting block are configured to respectively control the first control block and the second control block to support the abnormity detecting procedure; and
   storing, by at least one register, a length of each of the plurality of time intervals, the counting threshold value, and an upper limit value, wherein the abnormity event is that a flow value of the packet data reaches the upper limit value.

8. The abnormity detecting method of claim 7, further comprising:
   updating the length of each of the plurality of time intervals, the counting threshold value, or the upper limit value according to a setting command corresponding to an input of a user.

9. The abnormity detecting method of claim 7, wherein performing the abnormity processing procedure comprises:
   performing a packet drop procedure or a packet redirection procedure.

10. The abnormity detecting method of claim 9, wherein the packet redirection procedure comprises:
  redirecting the packet data to a connecting port which is in the network switch and is coupled to an external analyzing device.

11. The abnormity detecting method of claim 10, further comprising:
  adjusting, by the processor, the upper limit value corresponding to the abnormity event according to an analyzing result of the external analyzing device.

* * * * *